(12) United States Patent
Hallam et al.

(10) Patent No.: US 11,306,620 B2
(45) Date of Patent: Apr. 19, 2022

(54) METHOD OF REASSEMBLING A GAS TURBINE ENGINE

(71) Applicant: ROLLS-ROYCE plc, London (GB)

(72) Inventors: Christopher Richard Hallam, Derby (GB); Jonathan Paul Taylor, Derby (GB)

(73) Assignee: ROLLS-ROYCE plc, London (GB)

( * ) Notice: Subject to any disclaimer, the term of this patent is extended or adjusted under 35 U.S.C. 154(b) by 71 days.

(21) Appl. No.: 16/941,754

(22) Filed: Jul. 29, 2020

(65) Prior Publication Data
US 2020/0378274 A1 Dec. 3, 2020

Related U.S. Application Data

(62) Division of application No. 15/805,818, filed on Nov. 7, 2017, now Pat. No. 10,774,688, which is a division
(Continued)

(30) Foreign Application Priority Data
Nov. 19, 2013 (GB) .................... 1320425

(51) Int. Cl.
  *F01D 25/28* (2006.01)
  *B23P 19/04* (2006.01)
  (Continued)

(52) U.S. Cl.
  CPC ............ *F01D 25/285* (2013.01); *B23P 15/00* (2013.01); *B23P 19/04* (2013.01); *B64F 5/50* (2017.01);
  (Continued)

(58) Field of Classification Search
  CPC .... B23P 6/002; B23P 19/04; Y10T 29/49895; Y10T 29/49721; Y10T 29/49318
  See application file for complete search history.

(56) References Cited

U.S. PATENT DOCUMENTS 2,920,773 A 1/1960 William
3,795,323 A 3/1974 Ouska
(Continued)

FOREIGN PATENT DOCUMENTS

WO 99/02404 A1 1/1999

OTHER PUBLICATIONS

May 19, 2014 Search Report issued in British Application No. 1320425.0.
(Continued)

*Primary Examiner* — Sarang Afzali
(74) *Attorney, Agent, or Firm* — Oliff PLC

(57) ABSTRACT

A method of reassembling a gas turbine engine including steps to support a core engine on a core stand and support a fan case on a fan stand that includes a base frame coupled a fan case frame by a hinge. The fan case frame is arranged to (i) rotate about an axis of the hinge between abutting the base frame and being perpendicular to the base frame, and (ii) tilt about a yaw axis perpendicular to the hinge, which is located in a plane of the fan case frame. The method includes rotating and tilting the fan case frame to align the fan case and core engine, translating at least one of the core engine and the fan case into axial abutment, coupling the fan case and the core engine to reassemble the gas turbine engine, and decoupling the fan case from the fan stand.

3 Claims, 6 Drawing Sheets

Related U.S. Application Data of application No. 14/527,072, filed on Oct. 29, 2014, now Pat. No. 9,926,808.

(51) Int. Cl.

| | | |
|---|---|---|
| *B23P 15/00* | (2006.01) | |
| *B64F 5/50* | (2017.01) | |
| *F02C 7/20* | (2006.01) | |
| *F16M 11/42* | (2006.01) | |
| *B23P 6/00* | (2006.01) | |

(52) U.S. Cl.
CPC ............... *F02C 7/20* (2013.01); *F16M 11/42* (2013.01); *B23P 6/002* (2013.01); *Y10T 29/49318* (2015.01); *Y10T 29/49721* (2015.01); *Y10T 29/49895* (2015.01)

(56) References Cited

U.S. PATENT DOCUMENTS

| | | |
|---|---|---|
| 4,440,265 A | 4/1984 | Spagnoli |
| 4,461,455 A * | 7/1984 | Mills ........................ B64F 5/50 180/125 |
| 4,660,796 A | 4/1987 | Garrec |
| 5,645,389 A | 7/1997 | Lilja et al. |
| 5,816,367 A | 10/1998 | Lilja et al. |
| 5,870,824 A | 2/1999 | Lilja et al. |
| 6,000,903 A | 12/1999 | Hatch et al. |
| 6,170,141 B1 | 1/2001 | Rossway et al. |
| 6,292,999 B1 | 9/2001 | Rossway et al. |
| 6,298,536 B1 | 10/2001 | Rossway et al. |
| 6,443,408 B1 | 9/2002 | Hung |
| 7,014,154 B2 | 3/2006 | Jeong et al. |
| 7,424,994 B2 | 9/2008 | Jeong |
| 7,770,292 B2 * | 8/2010 | Stretton ................... B66C 1/10 29/889.1 |
| 8,215,596 B2 | 7/2012 | Duan et al. |
| 8,833,776 B2 * | 9/2014 | Boulanger ................ B66F 9/06 280/35 |
| 9,249,733 B2 | 2/2016 | Hallam et al. |
| 2012/0110816 A1 * | 5/2012 | Groves ..................... B66F 7/28 29/428 |
| 2013/0306830 A1 * | 11/2013 | Acuna ................... F01D 25/285 248/558 |

OTHER PUBLICATIONS

Mar. 23, 2015 Search Report issued in European Application No. 14 19 0642.
Jan. 27, 2017 Office Action Issued in U.S. Appl. No. 14/527,072.
Oct. 21, 2019 Office Action Issued in U.S. Appl. No. 15/805,818.
Apr. 6, 2020 Quayle Action Issued in U.S. Appl. No. 15/805,818.
Jul. 15, 2020 Notice of Allowance issued U.S. Appl. No. 15/805,818.

\* cited by examiner

METHOD OF REASSEMBLING A GAS TURBINE ENGINE

CROSS REFERENCE TO RELATED APPLICATIONS

This is a Division of U.S. application Ser. No. 15/805,818 filed on Nov. 7, 2017, which issued as U.S. Pat. No. 10,774,688 on Sep. 15, 2020, which is a Division of U.S. application Ser. No. 14/527,072 filed on Oct. 29, 2014, which issued as U.S. Pat. No. 9,926,808 on Mar. 27, 2018, which claims the benefit of GB 1320425.0 filed on Nov. 19, 2013. The disclosure of the prior applications is hereby incorporated by reference herein in its entirety.

BACKGROUND

The present invention relates to a gas turbine engine fan stand, a gas turbine engine stand assembly, a method of separating a gas turbine engine and a method of reassembling a gas turbine engine.

Gas turbine engines, particularly those used to power aircraft, must be transported off-wing periodically. For example, spare or replacement engines must be transported to the location of the storage facility or the aircraft to which they are to be fitted. Other engines must be removed from service and transported to the manufacturer or a repair and overhaul base for maintenance activity. Such transportation is typically achieved by loading the engine into the hold of a cargo aircraft such as a Boeing 747-400F or Boeing 777-200ERF.

Some modern gas turbine engines are too large to fit into the hold of such an aircraft. Thus it is necessary to split the engine into two components: the fan case and the core engine. Each of these components may then be loaded into the cargo bay separately, for example on air freight pallets, since neither of them exceeds the maximum dimensions of the hold and cargo bay doors.

SUMMARY

The present invention provides a gas turbine engine fan stand, a gas turbine engine stand assembly, a method of separating a gas turbine engine and a method of reassembling a gas turbine engine that seeks to address the aforementioned problems.

Accordingly the present invention provides a gas turbine engine fan stand comprising a base frame and a fan case frame coupled together at one edge by a hinge; the fan case frame arranged to:
  rotate about the hinge between abutting the base frame and substantially perpendicular thereto;
  tilt about a yaw axis perpendicular to the hinge and in the plane of the fan case frame; and
  the fan case frame further comprising a coupling arrangement to couple, in use, a fan case to the fan case frame; the coupling arrangement arranged to rotate about a roll axis perpendicular to the hinge, spaced therefrom and through the plane of the fan case frame.

Advantageously the fan stand of the present invention enables fine tuning of the movement of fan case frame so that a fan case supported thereby can be accurately aligned with a core engine supported by another stand. Alternatively the fan stand of the present invention enables fine tuning of the movement of fan case frame so it can be accurately aligned with a gas turbine engine supported by another stand in preparation for axial separation of that gas turbine engine.

The fan case frame may be arranged to rotate about the hinge by 90° to 100°. Advantageously this enables the fan case frame to move from abutting the base frame to vertical, even where the floor upon which the base frame rests is not perfectly horizontal. It also enables fine tuning of the angle of the fan case frame relative to the base frame to accommodate any angular mismatches with a gas turbine engine or core engine supported by another, adjacent, stand.

The fan case frame may be arranged to tilt about the yaw axis by 1° to 5°. For example the fan case frame may be arranged to tilt by ±2° to either side of a neutral position. Advantageously this enables fine tuning of the angle of the fan case frame relative to the base frame to accommodate any angular mismatches with a gas turbine engine or core engine supported by another, adjacent, stand.

The fan case frame may be arranged to rotate about the roll axis by up to 50°. Advantageously this enables fine tuning of the position of the coupling arrangement with a fan case to be supported. It also enables a supported fan case to be rotated to present the smallest dimension to a cargo bay or hold door of an aircraft. The fan case frame may rotate a small amount about the roll axis, for example a few degrees clockwise or anticlockwise, for fine tuning. The fan case frame may rotate a large amount in one direction, clockwise or anticlockwise, when in the horizontal attitude abutting the base frame.

The yaw axis and roll axis may be coincident. The yaw axis and roll axis may be mutually perpendicular. The yaw axis and roll axis may be coincident with the centre of the fan case frame. Advantageously this means rotation and tilt about these axes may be symmetrical and may act symmetrically on a supported fan case.

The fan stand may further comprise a cross frame to effect lateral movement of the fan case frame. Lateral movement is that parallel to the hinge. Advantageously this enables fine tuning of the lateral position of a fan case supported by the fan stand and a core engine supported by another stand, or between the fan stand and a gas turbine engine supported by another stand preparatory to splitting the engine.

The lateral movement may be up to 1% of the length of the hinge. The lateral movement may be up to 1% of the width of the fan stand in the direction parallel to the hinge. Advantageously this is sufficient lateral movement to fine tune the alignment of components. The lateral movement may be enabled in either direction away from a neutral position.

The fan stand may comprise a mechanism to effect at least one of the rotation about the hinge, tilt about the yaw axis, rotation about the roll axis and lateral movement of the cross frame. The mechanism may be a hydraulic mechanism, a mechanical mechanism, an electrical mechanism or an electronic mechanism. Advantageously the mechanism for each type of movement is the same, for example all hydraulic, since this may simplify the control. Alternatively the mechanism for at least one of the types of movement may be different to the mechanisms for one or more of the other types of movement.

The fan stand may further comprise an alignment feature configured to engage with a complementary alignment feature on a core stand. Advantageously this ensures that only fine tuning of the alignment of the fan stand and core stand, or those components supported by them, is required.

The present invention also provides a gas turbine engine stand assembly comprising:
  a core stand having a base frame and an engine frame which is configured to translate axially relative to the base frame; and a fan stand as described.

Advantageously the assembly enables a gas turbine engine to be supported, axially separated and axially reassembled.

The core stand may comprise an alignment feature configured to engage with a complementary alignment feature on the fan stand. Advantageously this ensures that only fine tuning of the alignment of the fan stand and core stand, or those components supported by them, is required.

The core stand may comprise a drive mechanism to effect the axial translation. The drive mechanism may be mechanical, hydraulic, electrical or electronic. Advantageously it enables controlled axial translation of the engine frame of the core stand relative to its base frame.

The assembly may further comprise accessory storage. Advantageously this ensures that all the parts of a gas turbine engine that are removed during use of the assembly are retained with the assembly.

The present invention also provides a method of separating a gas turbine engine, the gas turbine engine comprising a core engine and a fan case; the method comprising steps to:
  support the gas turbine engine on a core stand;
  move a fan stand as described into axial alignment with the core stand;
  rotate and tilt the fan case frame into abutting relation with the fan case of the gas turbine engine;
  couple the fan case to the fan case frame;
  decouple the fan case and core engine; and
  translate at least part of the core stand axially to separate the gas turbine engine.

Advantageously the method enables controlled axial separation of a core engine and fan case whilst preventing any lateral, vertical or twisting movement of the components.

There may be step before the first step to remove fan blades and a spinner from the gas turbine engine. Advantageously these may be stored in the accessory storage.

The method may further comprise a step to rotate the fan case frame about the hinge. Advantageously the fan case frame can be moved to the vertical alignment before the first step, between the first and second steps or before the third step of the method.

The method may further comprise a step to rotate the fan case frame about the roll axis. Advantageously the fan case frame may be rotated before the first step, between the first and second steps or before the third step of the method as well as during the third step of the method.

The present invention also provides a method of reassembling a gas turbine engine, the gas turbine engine comprising a core engine and a fan case; the method comprising steps to:
  support a core engine on a core stand;
  support a fan case on a fan stand as described;
  rotate and tilt the fan case frame to align the fan case and core engine;
  translate at least one of the core engine and the fan case into axial abutment;
  couple the fan case and the core engine to reassemble the gas turbine engine; and
  decouple the fan case from the fan stand.

Advantageously the method enables controlled axial reassembly of a gas turbine engine from its constituent components whilst preventing any lateral, vertical or twisting movement.

The method may comprise a further step to reassemble fan blades and a spinner to the gas turbine engine. Advantageously such components may have been stored in the accessory storage.

Any combination of the optional features is encompassed within the scope of the invention except where mutually exclusive.

BRIEF DESCRIPTION OF THE DRAWINGS

The present invention will be more fully described by way of example with reference to the accompanying drawings, in which.

DETAILED DESCRIPTION

Figure 1:
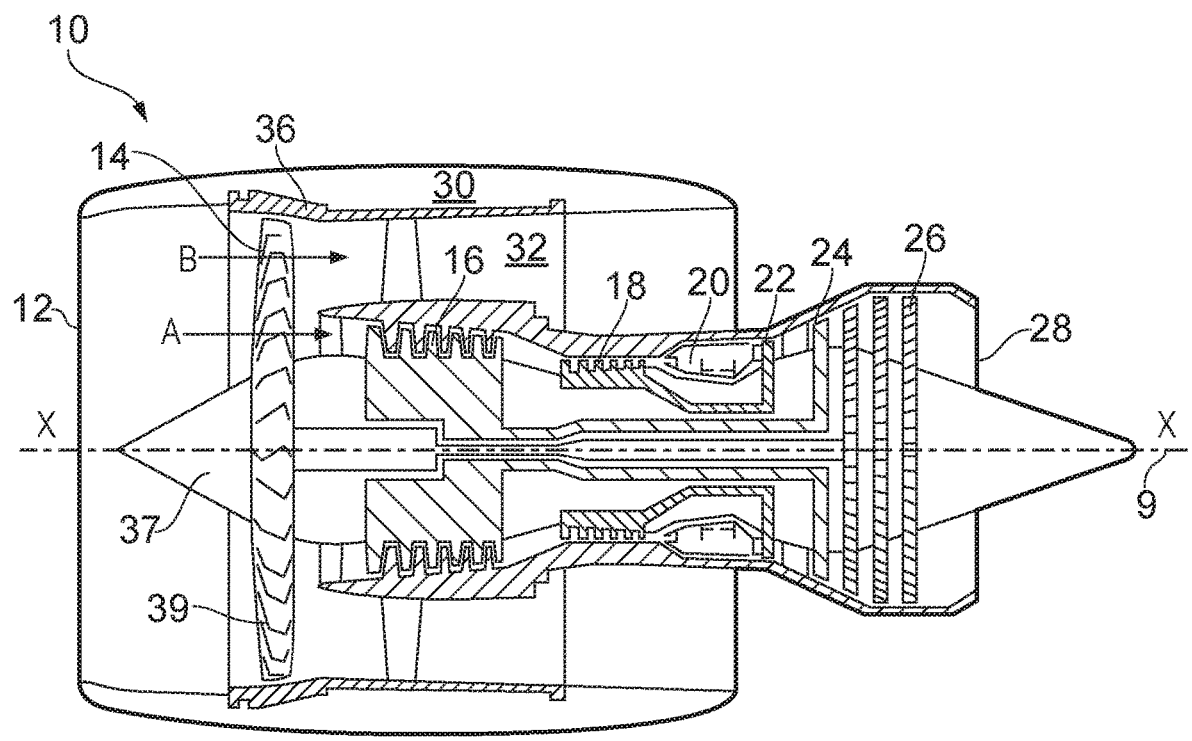
FIG. 1 is a sectional side view of a gas turbine engine.

A gas turbine engine 10 is shown in FIG. 1. It has a rotational axis 9 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. These components form the core engine 34. A nacelle 30 surrounds the gas turbine engine 10 and defines, in axial flow B, a bypass duct 32. The fan 14 and air intake 12 are surrounded by an annular fan case 36. For the purposes of this invention the nacelle 30 does not form part of the gas turbine engine 10.

Figure 2:
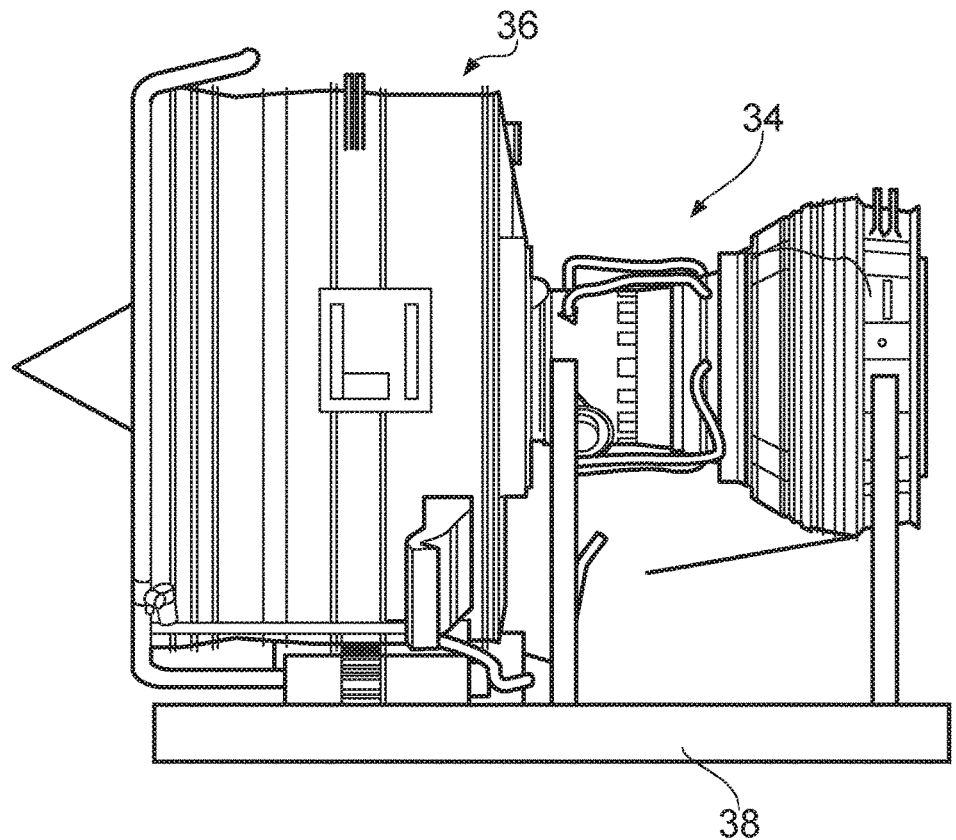
FIG. 2 is a schematic side view of a core stand supporting a gas turbine engine.
Figure 3:
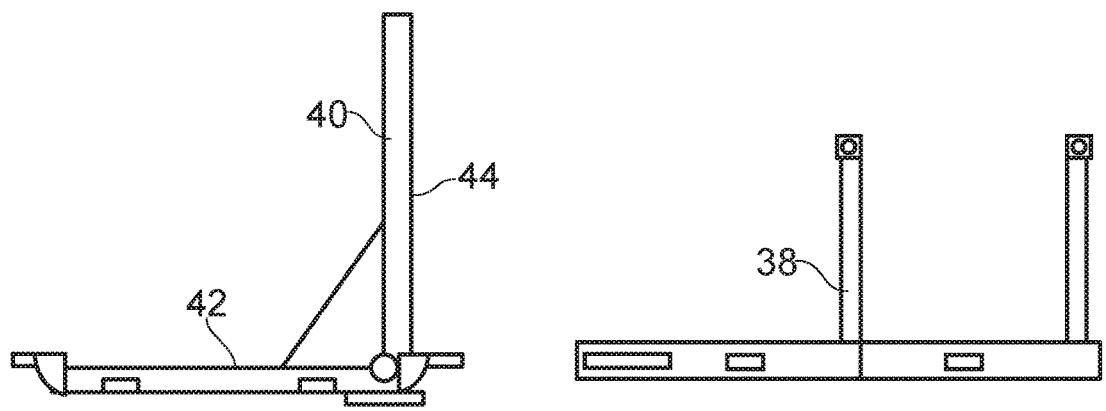
FIG. 3 is a schematic side view of a core stand and a fan stand according to the present invention.

FIG. 2 shows the core engine 34 and the fan case 36 supported in the horizontal orientation, that is with the axis 9 substantially horizontal, by a core stand 38. Prior to axial separation of the core engine 34 and fan case 36 the spinner 37 and fan blades 39 are removed. Also prior to axial separation, features of the engine 10 such as the bifurcation duct and A-frame may be removed. The core engine 34 and fan case 36 are coupled by an annular array of fastenings. FIG. 3 shows, highly schematically, the core stand 38 and a fan stand 40 according to the present invention. The fan stand 40 comprises a base frame 42 and a fan case frame 44.

Figure 4:
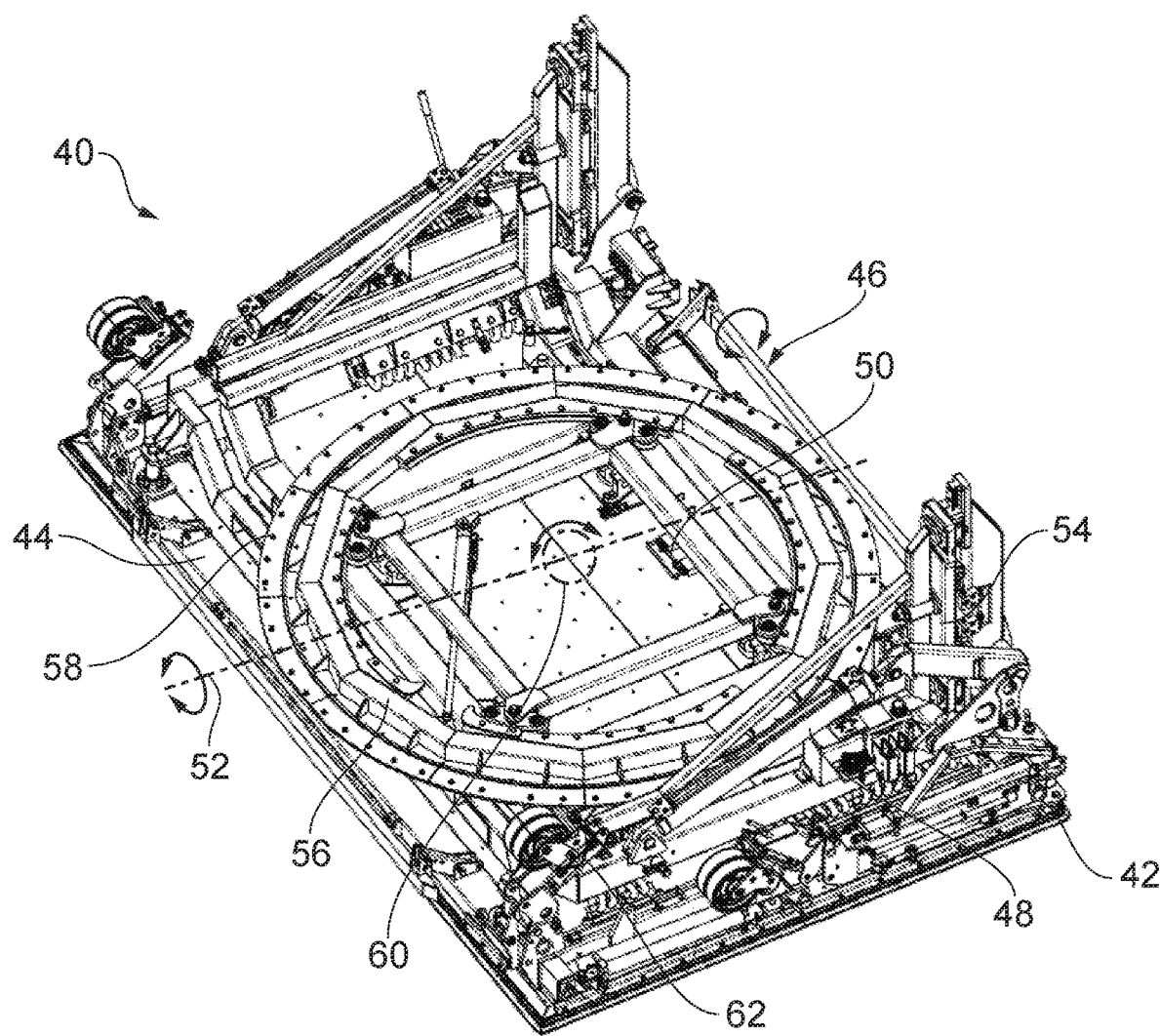
FIG. 4 is a perspective view of the fan stand according to the present invention.
Figure 5:
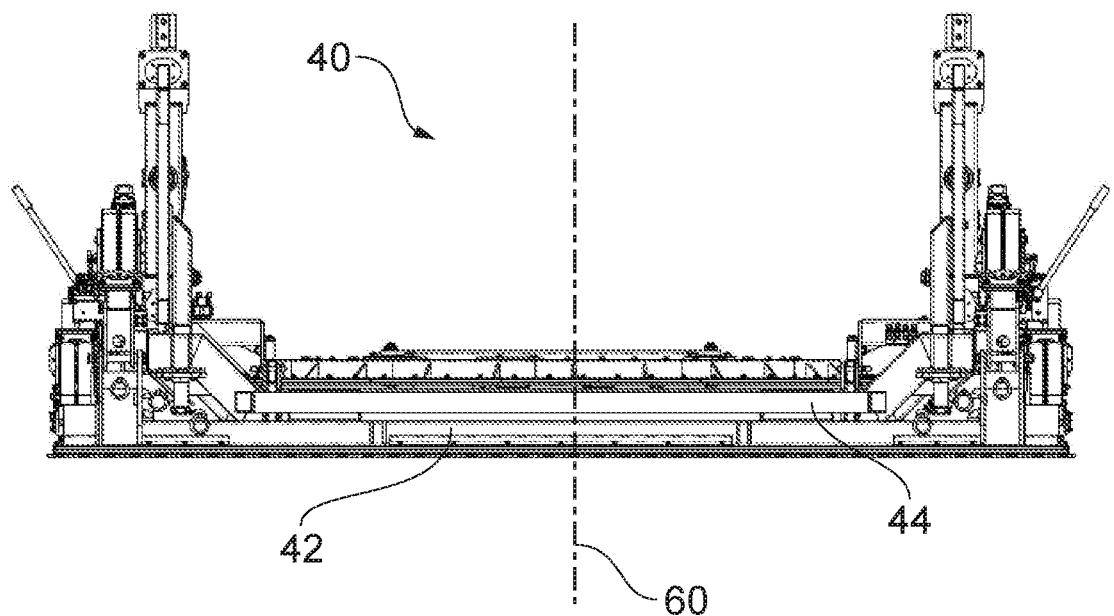
FIG. 5 is a front view of the fan stand according to the present invention.

The fan stand 40 is shown in more detail in FIG. 4 and FIG. 5. The base frame 42 is square or rectangular and is designed to sit firmly on the floor of a repair shop or on the ground where engine splitting or reassembly is performed outside. Optionally, therefore, it comprises adjustable feet or other means of providing a stable and flat platform. It may also comprise wheels or the like to permit the gas turbine engine stand 38 to be moved into position. The wheels may be retractable.

The fan case frame 44 is also square or rectangular in shape and has approximately the same dimensions as the base frame 42. The fan case frame 44 therefore defines a plane. The base frame 42 and fan case frame 44 are joined along one edge by a hinge 46. The hinge 46 is arranged to enable the fan case frame 44 to rotate approximately 90°, from a position abutting the base frame 42 to a position that is substantially perpendicular to the base frame 42. The angular movement about the hinge 46 is preferably 95° to 100° of rotation to enable a fan case 36 coupled to the fan case frame 44, as will be described below, to be oriented so that its rotational axis is horizontal and precisely coincides with the rotational axis of a core engine 34 to which it is to be mated. The rotation about the hinge 46 may be effected by hydraulic rams 48, preferably one on each side although only one ram 48 could be used. The rotation about the hinge 46 enables precise alignment of a fan case 36 coupled to the fan case stand 40 and a core engine 34 held in the core stand 38, or of the fan case frame 44 to a fan case 36 forming part of a gas turbine engine 10 held in a core stand 38.

A yaw axis 52 is defined with respect to the fan case frame 44. The yaw axis 52 is perpendicular to the hinge 46. It lies in the plane of the fan case frame 44. Thus it rotates between horizontal and vertical when the fan case frame 44 is rotated about the hinge 46. Preferably the yaw axis 52 bisects the fan case frame 44. This enables symmetrical adjustment of the orientation of the fan case frame 44 in each direction. The fan case frame 44 is arranged to tilt about the yaw axis 52, for example by virtue of a further hydraulic ram 54 or set of hydraulic rams 54 (shown in FIG. 6). The range of tilt is preferably 1° to 5°, for example ±2° from a neutral, untilted position. The tilt about the yaw axis 52 enables precise alignment of a fan case 36 coupled to the fan case stand 40 and a core engine 34 held in the core stand 38, or of the fan case frame 44 to a fan case 36 forming part of a gas turbine engine 10 held in a core stand 38.

Alternatively there may be one hydraulic ram or set of hydraulic rams which have two degrees of movement to effect both the rotation about the hinge 46 and the tilt about the yaw axis 52.

The fan case frame 44 can also be moved laterally with respect to the base frame 42. Here laterally means parallel to the hinge 46. The lateral movement is effected by one or more hydraulic ram 50 acting on a cross frame 78, shown in FIG. 6. The amount of lateral movement is small, less than 1% of the total width of the fan case stand 40, but allows for fine tuning of the position of a fan case 36 supported by the fan case frame 44 as will be described.

The fan case frame 44 also includes a coupling arrangement 56. This is a generally annular ridge, ring or flange with a diameter close to the length of the fan case frame 44 in the direction perpendicular to the hinge 46. The coupling arrangement 56 is arranged to couple to a fan case 36 to be supported by the fan stand 40. Thus it may comprise an array of apertures 58 that can be aligned with corresponding apertures on the fan case 36 and through which fastenings can be passed to secure the fan case 36 to the coupling arrangement 56 of the fan case frame 44.

A roll axis 60 is defined in relation to the coupling arrangement 56 of the fan case frame 44. It is perpendicular to the hinge 46 but spaced therefrom. The roll axis 60 is also perpendicular to the yaw axis 52, and so is mutually perpendicular to the hinge 46 and yaw axis 52. The roll axis 60 passes through the plane of the fan case frame 44. Preferably the roll axis 60 passes through the centre of the coupling arrangement 56, that is the locus point of the ring, ridge or flange that comprises the coupling arrangement 56. This means that the roll axis 60 and yaw axis 52 are coincident at a point in the centre of the fan case frame 44 and in its plane.

The coupling arrangement 56 is arranged to rotate about the roll axis 60. Preferably it rotates by up to 50°. A first purpose of this rotation is to enable alignment of the coupling features, such as apertures 58, with corresponding features on a fan case 36 to be supported by the fan case stand 40. A second purpose of the rotation is to enable a fan case 36 coupled to the fan case stand 40 to be rotated to a desired orientation for efficient transportation or packaging. For example, it may be beneficial to rotate a supported fan case 36 by approximately 45° in order to move an accessory gear box mounted thereon to be protected by portions of the fan case stand 40 or to align the larger diameter of the fan case 36 at this location with a longer dimension of the fan case stand 40. There may be a hydraulic ram 62 or set of hydraulic rams provided to effect the rotation about the roll axis 60.

Figure 6:
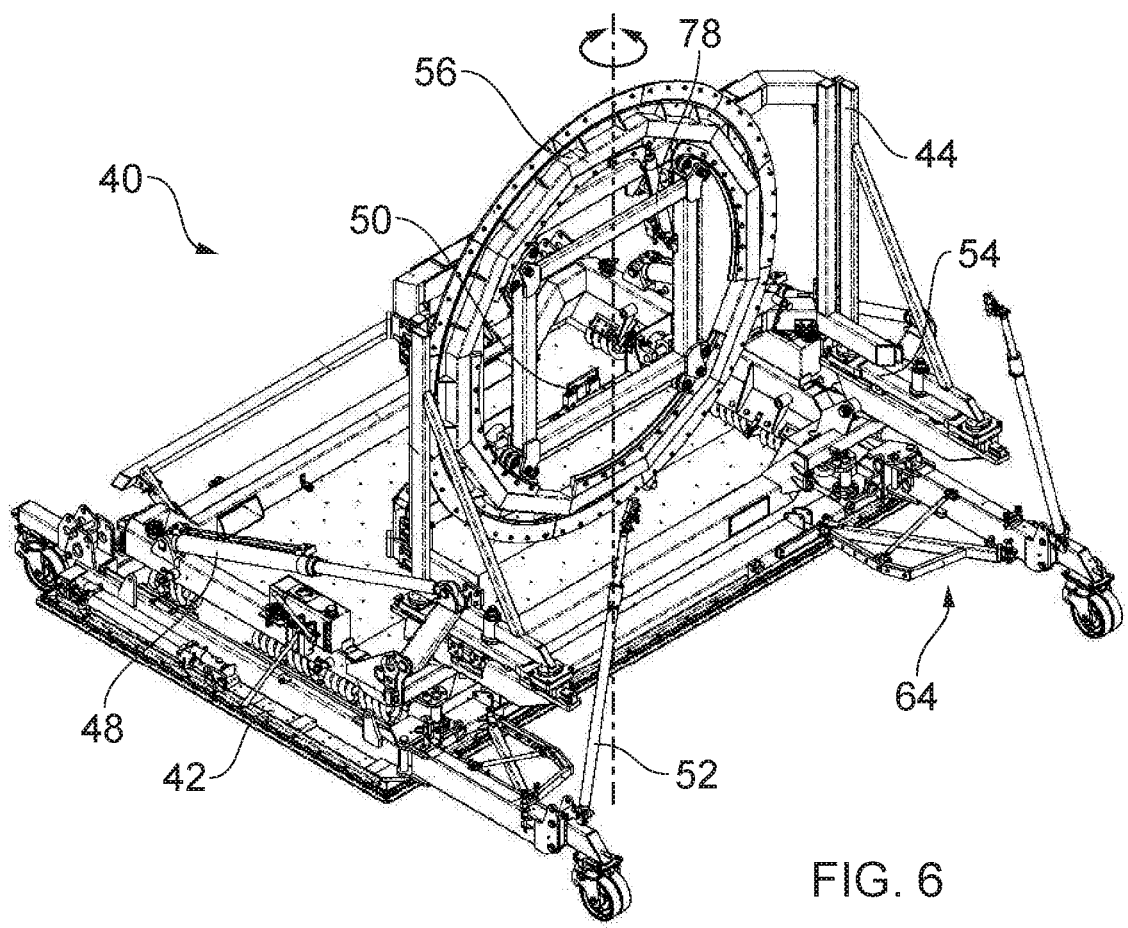
FIG. 6 is a perspective front view of the fan stand.

FIG. 6 shows the fan stand 40 for supporting a fan case 36 in the extended position where the fan case frame 44 is vertical and perpendicular to the base frame 42. The fan stand 40 also comprises alignment features 64, shown as triangular arrangements protruding between the ends of the hinge 46 and the wheel or castor arms. The alignment features 64 are coplanar with the base frame 42 and extend away from it. The alignment features 64 may be combined with wheels, rollers or skids to enable the fan stand 40 to be moved at least small distances.

Figure 7:
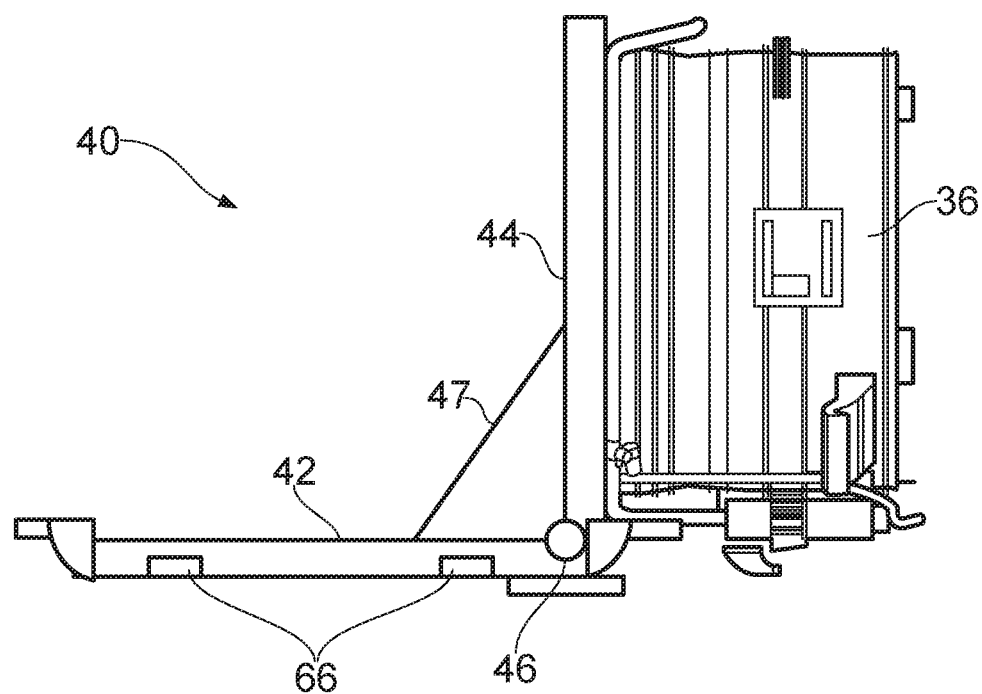
FIG. 7 is a schematic side view of the fan stand supporting a fan case.

FIG. 7 shows the fan stand 40 in the extended position, in highly schematic form, with a fan case 36 coupled to the coupling arrangement 56 of the fan case frame 44.

The fan stand 40 may also comprise forklifting apertures 66 that are connected by channels extending through the base frame 42 from the side, that is parallel to the hinge 46. The forklifting apertures 66 are sized and spaced to receive the prongs of a forklift truck therethrough. This provides a convenient mechanism for lifting and moving the fan stand 40, whether the fan case frame 44 is in the vertical (extended) or horizontal attitude. It is preferable that the fan case frame 44 be rotated about the hinge 46 until it abuts the base frame 42 before the fan stand 40 is moved using a forklift truck since the centre of balance of fan stand 40 and fan case 36 is then substantially collinear with the roll axis 60. However, the fan stand 40 may be moved using a forklift truck when the fan case 36 is coupled to the fan case frame 44 in the vertical attitude since the castors or wheels counterbalance the fan case 36.

Figure 8:
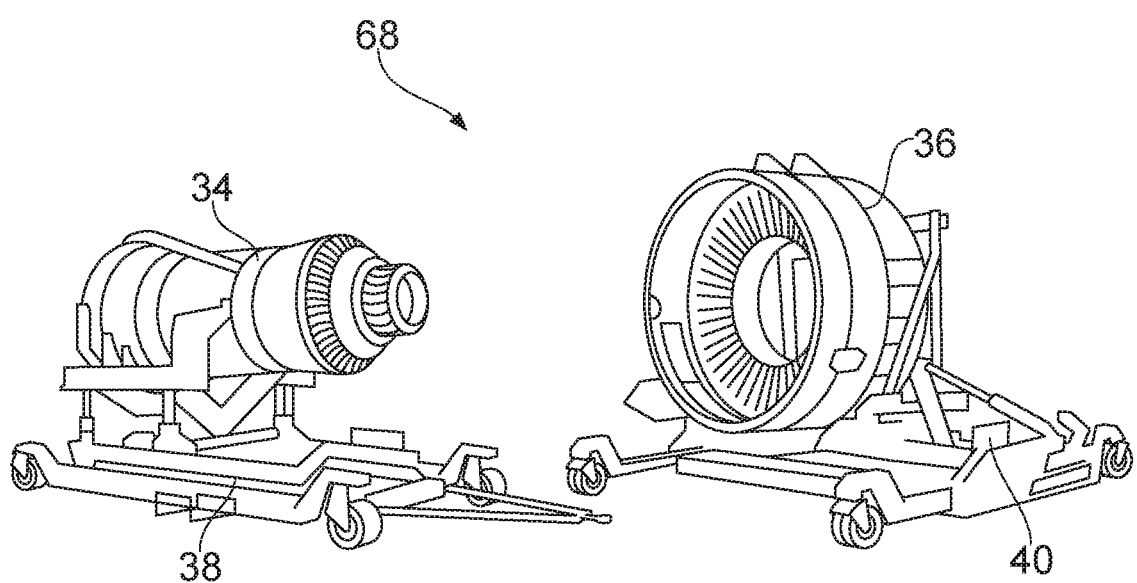
FIG. 8 is a perspective view of the gas turbine engine stand assembly according to the present invention.
Figure 9:
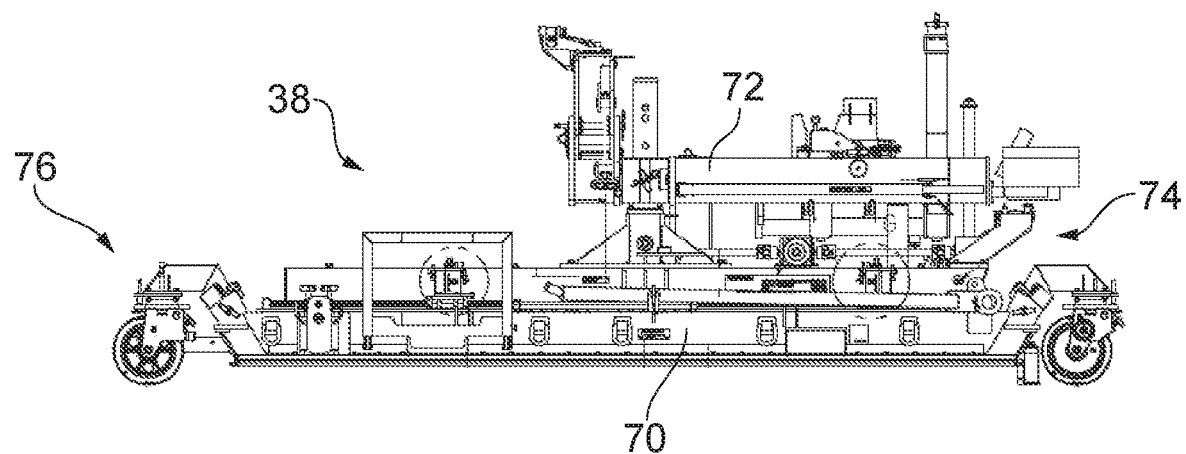
FIG. 9 is a side view of a core stand forming part of the stand assembly.

The present invention also comprises a gas turbine engine stand assembly 68 as shown in FIG. 8. The stand assembly 68 comprises the fan stand 40 as described above. It also comprises a core stand 38, which can be seen in more detail in FIG. 9. The core stand 38 comprises a base frame 70 and an engine frame 72. The engine frame 72 is configured to couple to a core engine 34 of a gas turbine engine 10 and to support either the core engine 34 or the full gas turbine engine 10. The engine frame 72 is configured to translate axially relative to the base frame 70.

The core stand 38 optionally comprises an alignment feature 76. For example there may be two alignment features 76 that are prongs, wheels or castors extending from the front of the base frame 70, the front being the area in which a fan case 36 is supported when a full gas turbine engine 10 is supported by the core stand 38. The alignment features 76 are configured to engage with the complementary alignment features 64 on the fan stand 40. Advantageously, the engagement of the alignment features 64, 76 ensures that a core engine 34 and fan case 36 supported by the core stand 38 and fan stand 40 respectively are substantially aligned. The rotation and tilt functionality of the fan stand 40 then allows fine tuning of the alignment of the components. Similarly, the engagement of the alignment features 64, 76 ensures that the fan stand 40 and a gas turbine engine 10 supported by the core stand 38 are substantially aligned. The rotation and tilt functionality of the fan stand 40 then allows fine tuning of the alignment of the components.

The core stand 38 optionally also comprises a drive mechanism 74, particularly a hydraulic mechanism, to effect the axial movement of the engine frame 72 relative to the base frame 70. Preferably the base frame 70 is held stationary whilst the engine frame 72 is translated axially. However, alternatively the base frame 70 may move as well the engine frame 72.

Figure 10:
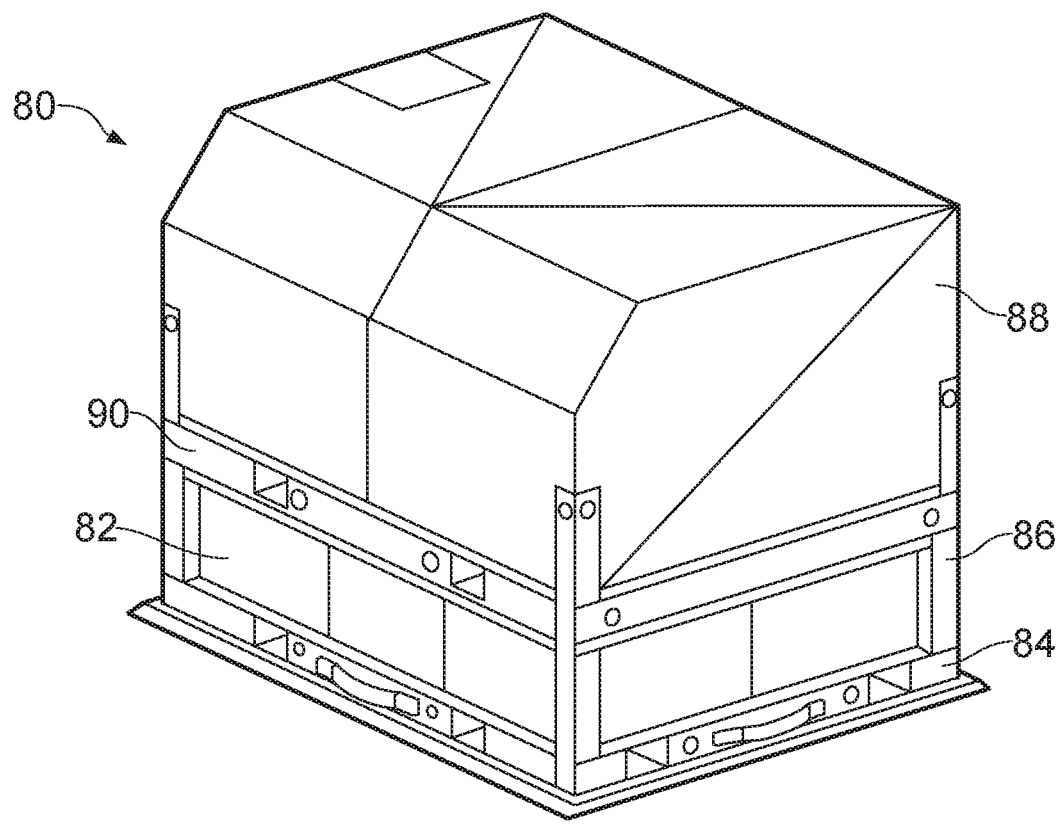
FIG. 10 is a perspective view of accessory storage forming part of the stand assembly.

The gas turbine engine stand assembly 68 optionally also comprises accessory storage 80, as shown in FIG. 10. This is comprised of a first box 82 that is mounted on an air freight pallet 84. The air freight pallet 84 may include vertically extending arms 86 at each corner. The box 82 sits within the space defined by the arms 86 and the air freight pallet 84. The accessory storage 80 also comprises a second box 88 mounted on an air freight pallet 90. Preferably the two air freight pallets 84, 90 are identical and interchangeable. The first box 82 has a height no more than the vertical extent of the arms 86 of the air freight pallet 84. The second box 88 has a greater height. This permits the air freight pallet 90 supporting the second box 88 to be stacked on top of the arms 86 of the air freight pallet 84 supporting the first box 82. Beneficially the accessory storage 80 can therefore be loaded into an aircraft hold or cargo bay as a single stack. Alternatively the first and second boxes 82, 88 may be loaded and transported separately.

The first and second boxes 82, 88 of the accessory storage 80 may be adapted to store accessories and parts of the gas turbine engine 10 removed during engine splitting. For example, the fan blades 39, spinner 37, electrical harnesses, pipes, fastenings, etc. The first and second boxes 82, 88 may be fitted with internal features to secure and space such components to prevent damage during transportation. The first box 82 or second box 88 may be adapted to receive and store suitable tooling for the engine splitting or reassembly.

Figure 11:
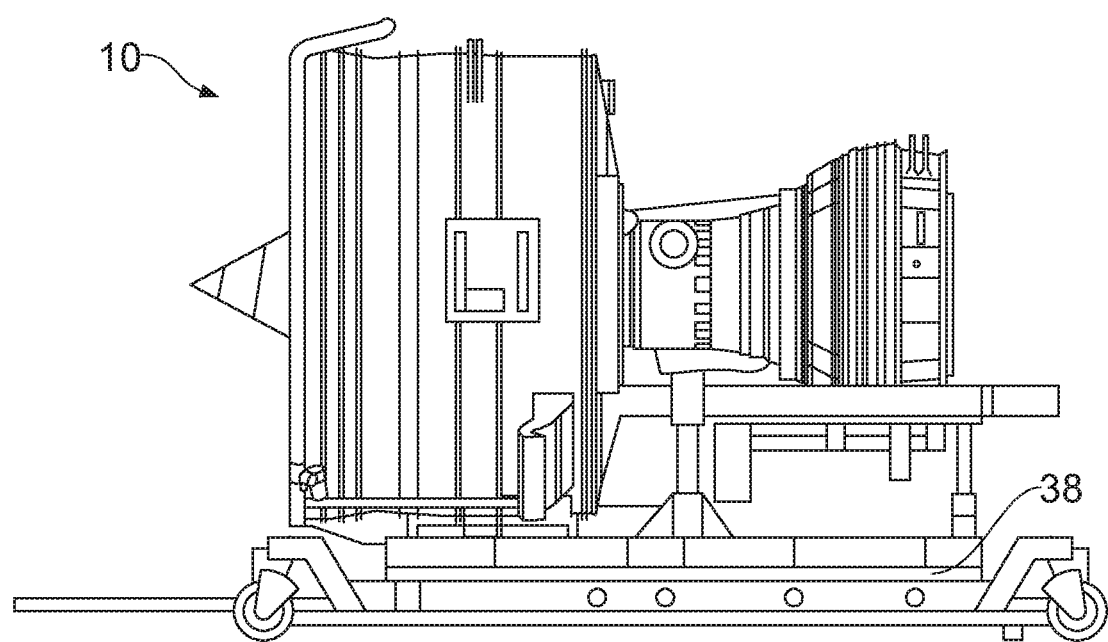
FIG. 11 is a side view of a core stand supporting a gas turbine engine.

A further aspect of the present invention provides a method of separating or splitting a gas turbine engine 10, for maintenance, transportation or storage. In a first step of the method the gas turbine engine 10 is supported on a core stand 38 as shown in FIG. 11. In a second step of the method a fan stand 40 as previously described is moved into axial alignment with the core stand 38. Advantageously the optional complementary alignment features 64, 76 are used to guide the core stand 38 and fan stand 40 into alignment and then to maintain them in that alignment.

An optional preparatory step, before the first step, may comprise removing fan blades 39 and the spinner 37 from the gas turbine engine 10. Alternatively this step may occur between the first and second steps of the method or after the second step of the method.

When necessary, the fan case frame 44 is rotated about the hinge 46 into the vertical position. This step is not always necessary because the fan case frame 44 may not have been in the closed position, abutting the base frame 42, at the start of the method.

In a third step of the method the fan case frame 44 is rotated about the hinge 46 and/or tilted about the yaw axis 52 and/or translated laterally until the fan case frame 44 is in abutting relation the fan case 36 of the gas turbine engine 10.

In a fourth step of the method the fan case 36 is coupled to the fan case frame 44, particularly to the coupling arrangement 56 thereof. For example a plurality of bolts or other fastenings can be passed through apertures 58 in the coupling arrangement 56 and corresponding apertures in the fan case 36. In a fifth step of the method the fan case 36 is decoupled from the core engine 34. For example, this may comprise removing the array of fastenings between the two components. Optionally it may be necessary to move the fan stand 40 and/or core stand 38 to accommodate the change in load taken by each stand during this decoupling step.

In a sixth step of the method the core stand 38 is translated axially to separate the gas turbine engine 10. Thus the fan case 36 is supported wholly by the fan stand 40 and the core engine 34 is supported wholly by the core stand 38.

A further step of the method comprises rotating the coupling arrangement 56 about the roll axis 60. This step may occur between the first and second steps, or between the second and third steps. It may occur before or after the fan case frame 44 is rotated about the hinge 46 to the vertical position, where this step occurs. This further step is not always necessary because the coupling arrangement 56 may not be at a different angular position at the start of the method to that required to couple the fan stand 40 to the fan case 36 of the gas turbine engine 10.

A still further aspect of the present invention provides a method of reassembling a gas turbine engine 10 that has been separated into a core engine 34 and a fan case 36 for maintenance, transportation or storage. In a first step of the method the core engine 34 is supported on a core stand 38. In a second step of the method a fan case 36 is supported on a fan stand 40 as previously described.

When necessary, the fan case frame 44 is rotated about the hinge 46 into the vertical position. This step is not always necessary because the fan case frame 44 may not have been in the closed position, abutting the base frame 42, at the start of the method.

In a third step of the method the fan case frame 44 is rotated about the hinge 46 and/or tilted about the yaw axis 52 and/or translated laterally until the fan case 36 is aligned with the core engine 34.

Optionally the core stand 38 and fan stand 40 may be brought close together and axially aligned before the third step of the method is completed to make the alignment of the fan case 36 and core engine 34 more apparent. Advantageously the optional complementary alignment features 64, 76 are used to guide the core stand 38 and fan stand 40 into alignment and then to maintain them in that alignment.

In a fourth step of the method the fan case 36 and core engine 34 are translated into axial abutment. This may be effected by moving one or both of the components. In particular the translation may be made by moving one or both of the fan stand 40 and core stand 38 or by translating the engine frame 72 of the core stand 38.

In a fifth step of the method the fan case 36 is coupled to the core engine 34 to reassemble the gas turbine engine 10. For example, this may comprise inserting and securing the array of fastenings between the two components.

In a sixth step of the method the fan case 36 is decoupled from the fan case frame 44, particularly from the coupling arrangement 56 thereof. For example a plurality of bolts or other fastenings may be undone and removed through apertures 58 in the coupling arrangement 56 and corresponding apertures in the fan case 36. Optionally it may be necessary to move the fan stand 40 and/or core stand 38 to accommodate the change in load taken by each stand during this decoupling step. Advantageously the gas turbine engine 10 is wholly supported by the core stand 38 at the end of this sixth step.

An optional further step of the method is to translate the gas turbine engine 10 axially away from the fan stand 40, for example by translating the engine frame 72 of the core stand 38. Alternatively the fan stand 40 may be translated away from the core stand 38 or the core stand 38 may be translated away from the fan stand 40.

An optional further step may comprise reassembling the fan blades 39 and the spinner 37 to the gas turbine engine 10. This step may occur before or after the gas turbine engine 10 and fan stand 40 are axially separated.

Hydraulic rams 48, 50, 54, 62 have been proposed to effect rotation and tilt about the yaw axis 52, roll axis 60 and the hinge 46 of the fan case stand 40. However, alternatively such rotation and tilt may be effected by other means such as electrical or electronic actuation, by lead screws powered electrically or mechanically, or by hand-operated screw jacks.

Although the present invention has been described with respect to a three-shaft gas turbine engine it is also applicable to a two-shaft gas turbine engine. In a two-shaft gas turbine engine the core engine 34 comprises the high pressure compressor 18, combustor 20, high pressure turbine 22 and low pressure turbine 26. It may also comprise a low pressure booster compressor.

Although the present invention has been described with respect to a gas turbine engine for powering an aircraft, it has equal felicity for gas turbine engines for industrial and marine applications.

The present invention also has applicability to other annular systems which need to be separated and joined axially, particularly those for which the tolerance between the first and second annular components is tight. For example, separating large diameter pipe sections of an oil or gas pumping pipeline. In this case the separated sections may be displaced vertically from each other, rather than axially.

The invention claimed is:

1. A method of reassembling a gas turbine engine, the gas turbine engine including a core engine and a fan case, the method comprising steps to:
   support a core engine on a core stand;
   support a fan case on a fan stand, the fan stand including:
      a base frame; and
      a fan case frame coupled to the base frame at one edge by a hinge, the fan case frame being arranged to: i) rotate about an axis of the hinge between abutting the base frame and being perpendicular to the base frame, and ii) tilt about a yaw axis perpendicular to the hinge, the yaw axis being located in a plane of the fan case frame, the fan case frame including a coupling arrangement configured to couple, in use, a fan case of a gas turbine engine to the fan case frame, the coupling arrangement being arranged to rotate about a roll axis perpendicular to the axis of the hinge, the roll axis being disposed through the plane of the fan case frame and being centrally located through the coupling arrangement;
   rotate and tilt the fan case frame to align the fan case and core engine;
   translate at least one of the core engine and the fan case into axial abutment;
   couple the fan case and the core engine to reassemble the gas turbine engine; and
   decouple the fan case from the fan stand.

2. The method of reassembling as claimed in claim 1, further comprising a step to translate the gas turbine engine axially away from the fan stand.

3. The method of reassembling as claimed in claim 1, further comprising a step to reassemble fan blades and a spinner to the gas turbine engine.

* * * * *